UNITED STATES PATENT OFFICE 2,140,309

TREATING ZINCIFEROUS MATERIALS

Jesse O. Betterton and William H. Bitner, Metuchen, N. J., assignors to American Smelting and Refining Company, New York, N. Y., a corporation of New Jersey No Drawing. Application December 4, 1935, Serial No. 52,825

8 Claims. (Cl. 75—1)

The present invention relates to the treatment of zinciferous materials containing cadmium, one of the objects of the invention being to provide an improved method of effecting a substantially complete removal of cadmium from such zinciferous materials without excessive losses of zinc. While of more especial technical advantage in removing cadmium, the invention contemplates the removal from zinciferous material of other contaminating metals, such as lead, arsenic and antimony.

In all pyrometallurgical processes of zinc extraction, cadmium follows zinc, so that no complete separation of the two metals has been possible. Accordingly, the presence of a relatively small percentage of cadmium in a zinc ore, or other zinciferous material, prevents the pyrometallurgical production therefrom of high grade zinc products such as zinc metal, zinc dust, zinc oxide, and the like, substantially free of cadmium. Cadmium and lead are technically the most commonly recognized contaminants of zinc ores and their concentrates; and appreciable amounts of these contaminants find their way into the product of the zinc recovery operation and thereby contaminate the zinc product obtained therefrom.

Prior art proposals for the elimination of cadmium and lead from zinc ores and concentrates fall into two general types, viz. (1) a heat treatment operation in the presence of a chloridizing agent, and (2) a blast roasting operation.

The first of these operations is objectionable because the evolved fume passes off as chlorides which cannot be collected in standard equipment, as the chlorides cause prohibitive destruction of the bags and other collecting equipment.

The second of these operations is inefficient, for in the blast roasting excessive losses of zinc are encountered and the conditions are not right for the elimination of cadmium and lead, as the requisite atmosphere control for efficient operation cannot be maintained.

Contrary to the teachings of the prior art, the present invention provides a process for eliminating cadmium and lead as fume from zinc ores or concentrates which eliminates both chloridizing and blast roasting, thereby enabling utilization of standard collecting equipment and avoiding excessive zinc losses. The process is based upon the discovery that efficient fuming of the cadmium and lead without fuming off any large amounts of zinc may be accomplished by controlling the atmosphere in the bed of ore or concentrate so that the atmosphere is maintained either neutral or slightly reducing, within the bed.

It has been found in operation that these conditions may be maintained in a convenient manner by stopping the usual preroast of the ore or concentrates short of a dead-roast, that is while there remains a substantial amount of sulphide sulphur (up to approximately 8%, for example); however it has been found also that straight zinc concentrates will give also good results. If the ore is already dead-roasted or is substantially oxide ore, good results are obtained by mixing with it from approximately 4% to approximately 8% of concentrates.

The charge crushed to a suitable fineness is mixed with a small amount, i. e. approximately 2% of carbonaceous material, such as bituminous coal, and heated in a kiln at temperatures ranging from approximately 1000° C. to 1200° C. it being preferred to maintain the fuming temperature below the sintering point of the charge, for convenience of handling through the kiln, but this is not absolutely necessary for good elimination.

The cadmium is volatilized quickly, the removal of lead being slower. Microscopic examinations of the fume eliminated have shown that some of the lead is eliminated as lead sulphide. It is thought, therefore, that the presence of sulphide sulphur in the charge in the kiln has a doubly beneficial effect, i. e. by helping to control the gaseous composition of the atmosphere in contact with the bed, producing a neutral to slightly reducing atmosphere through reaction of the sulphur with oxygen of the air present in the bed, and also by assisting the elimination of the lead as lead sulphide.

A possible further stage in the mechanism of the reaction may be the reduction by the limited amount of carbon of a portion of the zinc to metallic zinc vapor which disperses through the bed and acts upon the cadmium by reducing cadmium oxide to metal, which is vaporized and reoxidized after leaving the bed. The cadmium of course is present anyway in the charge only in small quantities.

The results of test runs made show a preferential elimination of the cadmium in the presence of a limited amount of carbon. This carbon should be present, preferably, in amounts not substantially above 4% at the maximum, as above this point there is a tendency towards excessive zinc losses. The carbon-bearing material preferably should be high in volatiles, so that bituminous coal is superior to coke or the like for this purpose.

In order to investigate the effects of varying limited amounts of carbonaceous reducing agent, a series of tests were run in which substantial amounts of sulphur were both absent and present. The materials tested are a preroast, identified as "Amarillo preroast", which was obtained by roasting zinc sulphide concentrates referred to hereinafter as "Amarillo concentrates", and which had a representative analysis represented below, and also what is refered to below as "Amarillo concentrate", having the typical analysis referred to below, and which is a zinc sulphide concentrate obtained by concentration of western zinc sulphide ores.

For showing the effects of sulphur, one of the examples set forth below shows the addition of sulphide concentrates to a "dead" preroast, and another example shows a sample of concentrates which was partially roasted so as to leave substantial quantities of residual sulphur.

The following examples are illustrative of the results which have been obtained in operating the present process.

*Example I*

"Amarillo preroast" obtained by roasting a mixture of western zinc sulphide concentrates referred to hereinafter as "Amarillo concentrates" until the sulphur content thereof has been partially eliminated, and assaying Cd 0.473%, Pb 2.25%, S 5.09%, Zn 61.4% was placed unmixed with carbon in a kiln which was closed except for a hole in one end to prevent the infiltration of excess air. The charge was heated for five hours at 1200° C. and the product produced assayed Cd 0.102%, Pb 1.24%, S 0.04%, Zn 64.1%.

*Example II*

Using the same "Amarillo preroast" as above, but adding 2% by weight of bituminous coal, and heating the resulting mixture in the kiln under the same conditions as above with respect to the kiln and with a treatment time of 2 hours at 1100° C. (as against 5 hours at 1200° C. as in Example I) the final product assayed Cd 0.000%, Pb 0.75%, S 1.84%, Zn 63.9%.

It will be seen, therefore, that there was at least a substantially complete elimination of cadmium, a very substantial elimination of lead, no material effect on the zinc, and a substantially higher content of residual sulphur.

*Example III*

In order to illustrate the effects of the presence of an excess of available (sulphide) sulphur in the charge, a sufficiency (4% by weight) of Amarillo zinc sulphide concentrates to assure an excess of sulphur over any oxygen which might be present in the bed and kiln atmosphere, was mixed with the Amarillo preroast. The charge thus prepared was heated for 2 hours in a suitable kiln under non-oxidizing conditions as above, at a temperature of 1135° C., and the final product assayed Cd 0.046%, Pb 0.51%, S .023%, Zn 67.1%.

There was no carbonaceous reducing agent in the charge, and it will be seen that a substantial reduction of both cadmium and lead was obtained.

*Example IV*

This example illustrates the results obtained by introducing a small amount of carbonaceous reducing agent into the charge of Example III.

In this run, Example III was repeated, with the exception that 1% of bituminous coal was intermixed with the charge of Example III so that the kiln charge contained 1% of bituminous coal and 4% of Amarillo zinc sulphide concentrates assaying as indicated hereinafter and from which the Amarillo preroast was obtained, mixed with the preroast. The charge was passed through a kiln with a heating period of two hours and an average temperature of 1135° C., while maintaining a non-oxidizing atmosphere in the kiln; and the final product assayed as follows: Cd 0.000%, Pb 0.18%, S 1.18%, Zn 67.1%.

A further elimination of lead was obtained here, over that obtained in Example II.

*Example V*

Using "Amarillo concentrates" assaying Cd 0.247%, Pb 2.31%, S 30.97%, Zn 53.0% and with the kiln under non-oxidizing conditions as above, with a heating time of three hours at 1100° C., and with no addition of carbonaceous reducing agent, the final product assayed Cd 0.20%, Pb 0.30%, S 28.4%, Zn 56.3%.

*Example VI*

The same charge of Example V was mixed with 2% by weight of bituminous coal as a reducing agent and Example V was repeated, again using a three hour heating period at 1100° C.

The final product assayed Cd 0.05%, Pb 0.09%, S 24.5%, Zn 61.0%.

*Example VII*

This illustration gives typical results on the partial preroasting of concentrates of the composition indicated above, so as to leave a substantial amount of unaltered sulphur in the charge. The partially roasted material, containing 8.5% of residual sulphur was mixed with 2% by weight of bituminous coal and heated in the kiln for three hours at 1100° C., while maintaining non-oxidizing conditions in the kiln as in the preceding examples.

The analysis of the original concentrate showed Cd .45%; Pb 1.05%; S 30%; Zn 55.0%.

The assay of the preroast was Cd 0.43%; Pb 0.15%; S 13.1%; Zn 62.3%.

The assay of the final product was Cd 0.0014%; Pb 0.06%; S 8.3%; Zn 65.3%.

The results of these tests summarize and compare as follows:

Amarillo preroast: assay: Cd 0.473%; Pb 2.25%; S 5.09%; Zn 61.4%. Straight calcine used.

| Hours in kiln | Average temperature, ° C. | Percent addition agent (bituminous coal) | Assay product produced | | | |
|---|---|---|---|---|---|---|
| | | | Cd, percent | Pb, percent | S, percent | Zn, percent |
| 3 | 1200 | | 0.102 | 1.24 | 0.04 | 64.1 |
| 2 | 1100 | 2 | 0.000 | 0.75 | 1.84 | 63.9 |

Amarillo preroast: assay: As above. Sulphide concentrates mixed therewith.

| Hours in kiln | Average temperature, ° C. | Percent addition agent | Assay product produced | | | |
|---|---|---|---|---|---|---|
| | | | Cd, percent | Pb, percent | S, percent | Zn, percent |
| 2 | 1160 | 4 (concentrate only) | 0.046 | 0.51 | 0.23 | 67.1 |
| 2 | 1135 | 1% bituminous coal +4% concentrate. | 0.000 | 0.18 | 1.18 | 67.1 |

The above comparison shows in the presence of 1% bituminous coal as reducing agent together with 4% zinc sulphide concentrate, an effect of reduction of Cd and Pb caused by the combined action of the coal and concentrate. Attention is called to the fact that while the addition of the concentrate and heat alone produced a substantial reduction of both cadmium and lead, the addition of the small amount of coal in the presence of the concentrates produced a substantially complete elimination of the cadmium and a materially further decrease in lead.

Amarillo concentrates: unroasted: assay Cd 0.24%; Pb 2.31%; S 30.97%; Zn 53.0%.

| Hours in kiln | Average temperature, °C. | Percent addition agent (bituminous coal) | Assay product produced | | | |
|---|---|---|---|---|---|---|
| | | | Cd, percent | Pb, percent | S, percent | Zn, percent |
| 3 | 1100 | | 0.20 | 0.30 | 28.4 | 56.3 |
| 3 | 1100 | 2 | 0.05 | 0.09 | 24.5 | 61.0 |

Again, in the presence of a relatively small amount of bituminous coal as the reducing agent, a substantially greater elimination of cadmium and lead was obtained than when the coal was omitted.

Partially roasted concentrate containing substantial amounts of sulphur with low lead: assay Cd 0.43%; Pb 0.15%; S 13.1%; Zn 62.3%.

| Hours in kiln | Average temperature, °C. | Percent addition agent (bituminous coal) | Assay product produced | | | |
|---|---|---|---|---|---|---|
| | | | Cd, percent | Pb, percent | S, percent | Zn, percent |
| 3 | 1100 | 2 | 0.0014 | 0.06 | 8.5 | 65.6 |

As further illustrative of the effects of sulphide sulphur, comparison may be made between Example I, above, and Example III. It will be recalled that in Example I, "Amarillo preroast" unmixed with reducing agent was treated, and in Example III, the only addition made to the preroast was 4% by weight of "Amarillo concentrates", no carbonaceous reducing agent being mixed with the charge; and it will be recalled also that these Amarillo concentrates produced the Amarillo preroast. Therefore, in the mixing of the preroast and concentrates the only additional element added was sulphide sulphur.

The assays of the preroast and the concentrates are repeated for reference.

| | Cd, percent | Pb, percent | S, percent | Zn, percent |
|---|---|---|---|---|
| Amarillo preroast | 0.473 | 2.25 | 5.09 | 61.4 |
| Amarillo concentrates | 0.247 | 2.31 | 30.97 | 53.0 |

Upon preparing the charges as above indicated, and subjecting each to similar treatment in a kiln the results showed the following comparison:

It will be seen from the above that in the case of the preroast, the cadmium was reduced from 0.473% to 0.102%, the lead from 2.25% to 1.24%. This reduction was effected by the heat alone, with a three hour heating time.

However, when 4% by weight of the concentrates was mixed with the preroast, in order to assure the presence of excess of available sulphur in the bed over free oxygen which might be present, the cadmium was reduced to 0.046% and the lead to 0.51%; and this very substantially greater elimination was obtained with a substantially less heating period and a substantially less temperature than was employed for a very much less efficient reduction in the case of the straight preroast. The tests show also that a complete elimination of cadmium is produced by the addition of only 1% of bituminous coal to the above mixture of preroast with 4% of concentrates.

The above tests show clearly that the presence of the reducing agent and the maintenance of non-oxidizing or reducing conditions in and around the bed facilitate the elimination of both cadmium and lead from the charge. These observations were confirmed by making a run wherein the kiln was maintained filled with an inert gas (nitrogen) thus assuring complete elimination of air from the kiln.

In carrying out the operation, the ore or concentrate may be first roasted in a multiple-hearth type of roaster, preferably until the sulphide sulphur content reached the value above indicated; or if the roasting proceeds further, a sufficient quantity of concentrate may be added to make up the desired sulphur content. The charge is then mixed with the carbonaceous material and heated for example in a suitable kiln with a time of passage of approximately three hours at approximately 1100° C. to 1200° C., the evolved fume being collected in a bag-house, or other standards type of fume-collecting equipment.

During the fuming operations, the composition of the atmosphere in the bed and around the charge is controlled so as to avoid free oxygen in the atmosphere. To this end, the combustion gases entering the kiln are controlled in their composition so as to avoid introducing even enough oxygen to react with all of the sulphide sulphur in the charge, the sulphur being maintained in excess of the oxygen, so as to react with any free oxygen present in the combustion gases so as to convert any such oxygen completely into sulphur dioxide, the pressure of the sulphur thereby completing the control of the atmospheric composition. The bed in the kiln should be maintained comparatively thin, not more than approximately two inches of depth being preferred.

The above-mentioned atmospheric control is obtained by maintaining in the bed a sufficient excess of available sulphur to react completely with the oxygen present. This available sulphur conveniently may be supplied by the addition of zinc concentrates to the bed as may be required; or by the addition of sulphur itself, or sulphides.

| Charge | Hours in kiln | Average temperature, °C. | Percent addition agent | Assay product produced | | | |
|---|---|---|---|---|---|---|---|
| | | | | Cd, percent | Pb, percent | S, percent | Zn, percent |
| Amarillo preroast | 3 | 1200 | | 0.102 | 1.24 | 0.04 | 64.1 |
| Amarillo preroast+concentrates | 3 | 1100 | 4% concentrates | 0.046 | 0.51 | 0.23 | 67.1 |

Where a kiln is employed for the fuming operations, it may be pointed out that the kiln residue is such that it may be sintered preparatory to retorting in accordance with standard sintering practice to produce a sinter having the best physical properties for retorting. No blast sintering is employed, as is required in certain of the prior art processes, and the cadmium and lead have been eliminated prior to placing the residue on the sintering apparatus. The sintering practice is highly standardized, its principal benefit to a retort plant being that it imparts the best physical characteristics to the material for retorting. Now, where the material to be sintered has been treated with materials for fuming off the cadmium and lead during the sintering as in certain prior proposals using blast sintering, these materials interfere with correct sintering and necessitate a modification of standard sintering conditions, and the best characteristics for retorting may not be obtained. In the present process, however, there is nothing present in the residue which could interfere with standard sintering practice, and the cadmium and lead have been eliminated prior to the sintering operation.

What is claimed is:

1. The method of treating zinciferous materials such as ores, concentrates, calcines, flue dusts and the like containing cadmium and lead which comprises forming a bed of such material and heating said bed in a continuous manner to fuming temperature of cadmium and lead but below sintering temperature of the bed, while controlling the atmosphere in and around the bed by the addition of an amount of sulphide providing sulphur in stoichiometrical excess of the oxygen present in said atmosphere.

2. The method of treating zinciferous sulphide materials containing cadmium and lead which comprises mixing therewith a carbonaceous material in relatively small quantities, forming a bed of the resulting mixture, heating the bed sufficiently high to effect volatilization of the cadmium and lead therefrom but below sintering temperature of the bed, and controlling the atmospheric conditions in and around the bed by adding sufficient sulphide-bearing material thereto to provide an excess of available sulphur over the oxygen in the atmosphere in and around the bed.

3. The method of treating zinciferous materials such as calcines, concentrates, ores, flue dusts and the like containing cadmium and lead, which comprises forming a bed of such material and heating the said bed to fuming temperature of cadmium and lead while controlling the atmosphere in and around the bed by adding sufficient zinc concentrates to supply an excess of available sulphur over the oxygen present in the atmosphere within and around the bed to prevent free oxygen from contacting with the bed.

4. The process for treating zinciferous ores or concentrates containing cadmium which comprises forming a bed of the said ores and heating said bed within an approximate temperature range of from 1000° C. to 1200° C. in the presence of a limited amount of coal in quantity sufficient to eliminate substantially all of the cadmium as fume while avoiding substantial volatilization of zinc, and effecting a control of the furnace atmosphere to avoid oxidizing conditions therein by maintaining an excess of sulphide sulphur in the bed over the amount of available oxygen in the furnace gases.

5. The process according to claim 4 in which the amount of coal is approximately 2% by weight of the ore being treated.

6. The method of treating zinciferous ores or concentrates containing cadmium and lead which comprises forming a charge of the said ores and heating said charge to a temperature of approximately 1000° C. to approximately 1200° C. in the presence of such quantity of coal as is sufficient to eliminate substantially all of the cadmium as fume but insufficient to effect any substantial volatilization of zinc, and effecting an automatic control of furnace conditions insuring a non-oxidizing atmosphere in and about said charge throughout the treatment.

7. The method of treating zinciferous sulphide materials containing cadmium and lead which comprises forming a bed of the said materials, heating said bed to fuming temperature of cadmium and lead, adding sulphide sulphur-bearing material to the bed to maintain the sulphur content of the bed in excess of the oxygen content of the atmosphere within and around the bed thereby assuring the maintenance of non-oxidizing atmospheric conditions in the bed and volatilizing substantially all of the cadmium and large amounts of lead from the bed while suppressing volatilization of any substantial amounts of zinc therefrom.

8. The process for treating zinciferous calcines, concentrates, ores, flue dusts or the like which comprises forming a bed thereof, heating said bed to a temperature sufficient to effect fuming of cadmium and lead without sintering of the bed, and adding sulphur in available form to the bed in sufficient quantity to maintain a non-oxidizing atmosphere within and about the bed until substantially all of the cadmium and the bulk of the lead have been fumed from the bed.

JESSE O. BETTERTON.
WILLIAM H. BITNER.